Patented Mar. 6, 1945

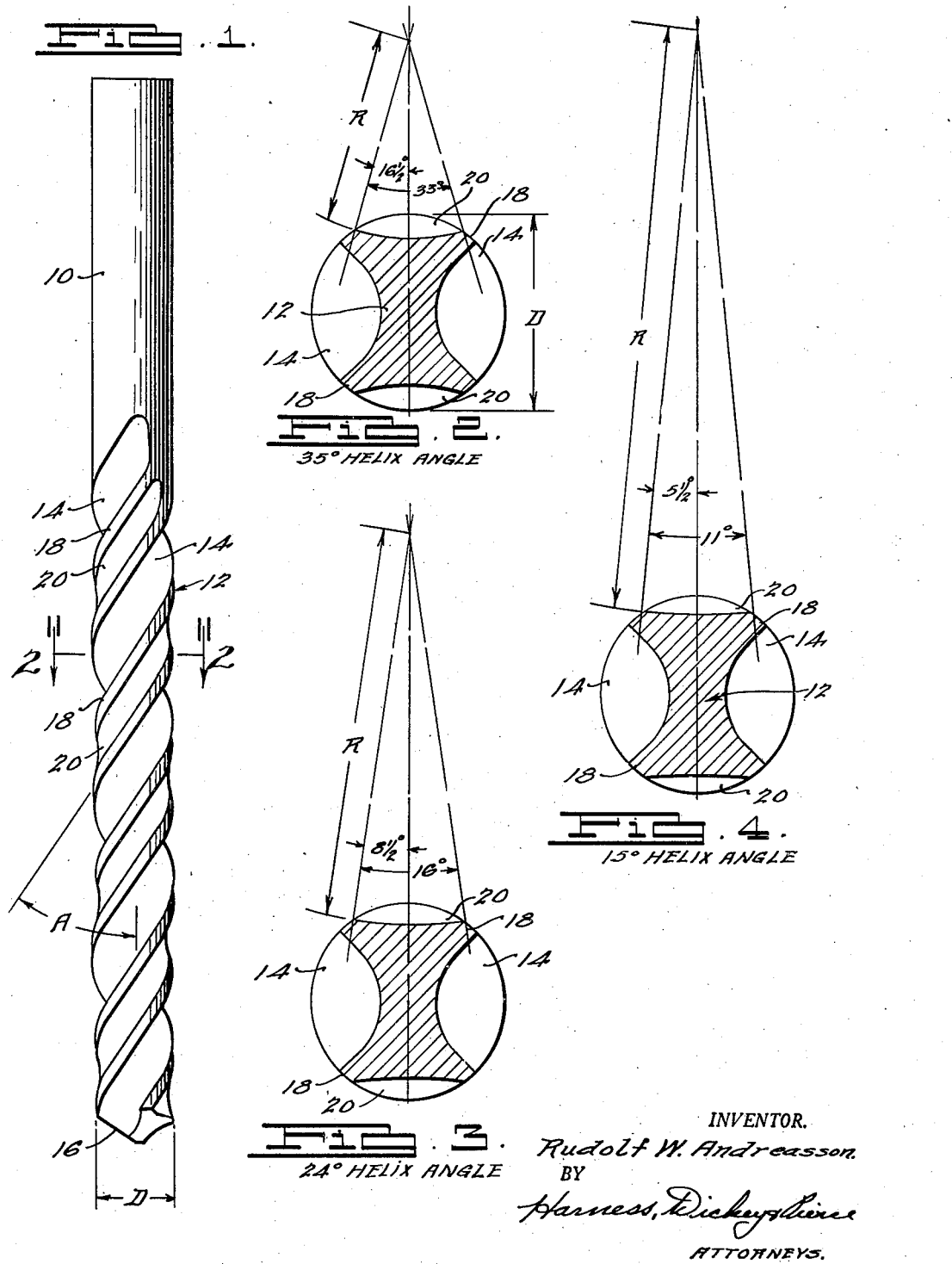

2,370,706

UNITED STATES PATENT OFFICE 2,370,706

DRILL

Rudolf W. Andreasson, Detroit, Mich.

Application November 29, 1943, Serial No. 512,109

2 Claims. (Cl. 77—70)

This invention relates to drills and particularly to twist drills and has for its principal object the provision of a twist drill of new and novel construction.

Objects of the invention include the provision of a twist drill in which the lands thereof are relieved in a new and novel manner; the provision of a twist drill in which the lands thereof are relieved only between the opposite edges of the lands; the provision of a twist drill as above described relieved only between the opposite edges of the lands and in which the relief is of a predetermined cross-sectional configuration; the provision of a twist drill as above described in which the configuration of the relief is partially circular in section; and the provision of a twist drill as above described in which the radius of the relief bears a predetermined relation with respect to the helix angle and diameter of the drill.

The above being among the objects of the present invention, the same consists in certain novel features of construction to be hereinafter described with reference to the accompanying drawing, and then claimed, having the above and other objects in view.

In the accompanying drawing which illustrates suitable embodiments of the present invention and in which like numerals refer to like parts throughout the several different views, Fig. 1 is a side elevational view of a twist drill embodying features of the present invention;

Fig. 2 is an enlarged cross-sectional view taken on the line 2—2 of Fig. 1; and

Figs. 3 and 4 are views similar to Fig. 2, but illustrating the form of relief employed for drills of different helix angles.

Although the drill of the present invention is particularly adaptable for use in connection with the drilling device shown and claimed in my application for Letters Patent of the United States filed September 30, 1943, and serially numbered 504,351 and in which the relief in the lands of the drill is employed for conducting oil, cutting compound or the like to the point of the drill during a cutting operation, I have found that this drill possesses certain advantages regardless of its use. In other words, regardless of its use, it will be found to be extremely resistant to breakage under torsion, it acts to centralize itself in a hole being drilled, even though improperly sharpened, to a much greater extent than conventional types of twist drills, and the form of relief is such as to enable it to be readily, quickly, and cheaply formed by various types of apparatus.

It is not new to provide twist drills in which the lands thereof are relieved only between the opposite side edges thereof, but as far as I am aware, in the past such relief has taken the form of a groove located centrally of the land and with the bottom of the groove struck on a curve coincident with the axis of the drill. In such cases, the side walls of the relief groove are approximately perpendicular to the bottom surface thereof and the junction between the side and bottom walls of the relief groove are relatively sharp, thereby engendering rupture at such point when the drill is subjected to heavy torsional loads. In accordance with the present invention, the relief groove is so formed as to eliminate any such sharp edges and it has been found that thereby the torsional strength of the drill is greatly increased.

In accordance with the present invention, the relief is curved and is preferably circular in cross-sectional configuration and struck from a center located outside of the periphery of the drill, a radial line connecting the center of the drill and the center of curvature of the relief passing approximately centrally through the lands so that the relief itself terminates short of the opposite edges of the land. This means that each land provides two angularly separated areas of contact between the drill and the work so that in a conventional two-fluted drill there are four areas of contact between the drill and the walls of the bore it is drilling to more accurately maintain the concentricity of the drill and the bore regardless of errors in sharpening the point of the drill. The form of relief provided by the present invention provides a construction in which the edges of the lands are more strongly reinforced than where the conventional type of land relief is employed, and breaking or chipping of the cutting edges along the advanced edges of the lands is thereby minimized.

The cross-sectional curvature of the relief in the lands in accordance with the present invention may in the broader aspects of the invention vary to a greater or lesser extent, but in accordance with a more limited phase of the present invention, the curvature should bear a definite relationship with respect to the helix angle of the drill in order to obtain optimum results. In other words, I have found that the greater the helix angle of the drill the smaller the radius of curvature of the relief should be, and vice versa, and that the radius of the relief should bear a definite relationship with respect to the diameter of the drill.

Referring now to the accompanying drawing, a twist drill is illustrated in Fig. 1 as having a shank 10 and a body indicated generally at 12. The body 12 may, of course, be fluted in any conventional manner, that is, it may have two or more flutes therein equally angularly spaced about the axis of the drill in accordance with conventional practice. For the purpose of illustration, the more common two-fluted type is illustrated. Accordingly, the body 12 is provided with two diametrically opposed or equally angularly spaced flutes 14 formed therein, each extending helically about the axis of the drill from the shank 10 to the opposite end of the drill which is pointed and sharpened as at 16 in a conventional manner.

In accordance with the present invention, the lands 18 between the flutes 14 are centrally relieved as at 20 and only between the opposite edges of such lands. The relieved areas 20 terminate a short distance from the opposite edges of the lands, which distance, of course, will vary in accordance with the diameter of the drill, but in all cases will leave a sufficient amount of the lands to remain to provide a desired amount of bearing surface between the drill and the bore being drilled. It will also be understood that if desired the unrelieved portion of the land on the trailing side thereof may be relieved a slight amount as compared to the unrelieved portion thereof at the leading edge of the land as, for instance, by a matter of a few thousandths of an inch.

In accordance with the present invention, the relief 20 for each land 18 is of curved cross-sectional conformation so that it forms a concave groove-like relief in the land. For manufacturing reasons, it is preferably partially circular in section with the center of curvature located beyond the periphery of the drill and preferably substantially on a line passing through the axis of the drill and midway between the opposite edges of the land as brought out in Fig. 2.

As previously stated, while in the broader aspects of the invention the curvature of the bottom wall of the relief 20 may be varied to a greater or lesser extent in any particular drill, I have found, in accordance with a more limited phase of the present invention, that the radius of such relief, when circular, should bear an approximately definite relationship not only to the diameter of the drill, but to the helix angle of the drill in order to obtain optimum conditions. The curvature of the relief in such cases may be approximately determined by the following formula:

$$R = \frac{45-A}{10} \times D$$

where R = the radius of the curvature of the relief in inches, A = the helix angle of the drill in degrees; and D = the diameter of the drill in inches.

The drill shown in Fig. 1 is intended to have a 35 degree helix angle of the flutes 14 and lands 18. Applying the above formula to such drill, it will be noted that the radius of the relief equals 45 minus 35 divided by 10×D, or D. Accordingly, it will be observed that in accordance with this formula the radius of the relief for a 35 degree helix angle drill should be approximately equal to the diameter of the drill, and this is the condition illustrated in Fig. 2. The arc of such relief in such case, measured angularly about its center, and with a preferred amount of the land remaining for bearing against the walls of the bore to be drilled thereby, will be approximately 33° as shown in Fig. 2.

On the other hand, applying the above formula to a drill having a 24 degree helix angle as assumed in Fig. 3, then R under such conditions will approximately equal 2D or will be approximately equal to twice the diameter of the drill. The arc of the relief in such case will be approximately 16° as shown. On the other hand, where a drill having a 15 degree helix angle is relieved in accordance with the present invention, then as illustrated in Fig. 4 and applying the above formula thereto it will be noted that the radius of relief in such case will be approximately equal to three times the diameter of the drill. The arc of relief in such case will be approximately 11° as shown.

One fact will be appreciated by those skilled in the art and that is that with the type of relief provided by the present invention the relief may be easily and quickly formed in the lands of drills with substantially no difficulty because of possible interference between the relieving tool and the work.

Having thus described my invention, what I claim by Letters Patent is:

1. A twist drill having a land relieved between the opposite side edges thereof and being substantially unrelieved along said side edges, said relieved surface being arcuate in cross-sectional configuration and struck about a center lying radially outwardly of the periphery of said drill, the approximate radius of said circle being calculated according to the formula $$R = \frac{45-A}{10} \times D$$

where R is the radius of said circle in units of measurement, A is the helix angle of said land in degrees, and D is the diameter of said drill in said units of measurement.

2. A twist drill having a concavity in a land thereof forming a relief the surface of which is partially circular in cross-sectional view and in which the radius of the relief circle in inches is approximately equal to, 45 minus the helix angle of the drill in degrees, divided by 10, and multiplied by the diameter of the drill in inches.

RUDOLF W. ANDREASSON.